United States Patent [19]

Chretien et al.

[11] Patent Number: 5,323,616

[45] Date of Patent: Jun. 28, 1994

[54] PROCESS FOR COOLING A GAS IN AN APPARATUS FOR EXPLOITING GASES PRESENT IN THE AIR

[75] Inventors: Denis Chretien, Saint Mande; Philippe Mazieres, Montfermeil, both of France

[73] Assignee: L'Air Liquide, Societe Anonyme pour l'Etude et l'Exploitation des Procedes Georges Claude, Paris, France

[21] Appl. No.: 132,700

[22] Filed: Nov. 30, 1993

Related U.S. Application Data

[63] Continuation of Ser. No. 941,737, Sep. 8, 1992, abandoned.

[30] Foreign Application Priority Data

Sep. 13, 1991 [FR] France .................... 91 11305

[51] Int. Cl.⁵ ............................................ F25J 3/02
[52] U.S. Cl. .................................. 62/24; 62/40; 62/476
[58] Field of Search ..................... 62/24, 40, 476

[56] References Cited

U.S. PATENT DOCUMENTS

| | | | |
|---|---|---|---|
| 3,817,046 | 6/1974 | Aoki et al. | 62/40 |
| 4,054,433 | 10/1977 | Buffiere et al. | 62/40 |
| 4,785,621 | 11/1988 | Alderson | 62/38 |
| 4,873,839 | 10/1989 | Dessanti et al. | 62/238.6 |
| 4,911,741 | 5/1990 | Davis et al. | 62/40 |
| 4,936,099 | 6/1990 | Woodward et al. | 62/24 |
| 5,036,672 | 8/1991 | Rottmann | 62/24 |
| 5,081,845 | 1/1992 | Allam et al. | 62/38 |

FOREIGN PATENT DOCUMENTS 0367428 5/1990 European Pat. Off. .
3114842 10/1982 Fed. Rep. of Germany .

*Primary Examiner*—Ronald C. Capossela
*Attorney, Agent, or Firm*—Curtis, Morris & Safford

[57] ABSTRACT

Compressed air, feeding a unit for the separation of gases present in air, releases calories to a refrigerating unit which operates by absorption while cooling a flow of liquid in heat exchange relationship with a gas of the apparatus to cool the latter so as to ensure a reduction of the global energy consumption of the apparatus.

24 Claims, 2 Drawing Sheets

PROCESS FOR COOLING A GAS IN AN APPARATUS FOR EXPLOITING GASES PRESENT IN THE AIR

This application is a continuation of application Ser. No. 07/941,737, filed Sep. 8, 1992 now abandoned.

BACKGROUND OF INVENTION (a) Field of the Invention

The present invention concerns a process for cooling a gas in an apparatus for exploiting gases present in the air comprising at least one unit for separating gases present in the air which is operated by compressed air.

(b) Description of Prior Art the apparatuses for exploiting gases present in the air and in particular their associated units for the separation of gases present in the air, such as oxygen, nitrogen and argon, in known manner of a type with a double distillation column, consume a large amount of energy, such as with respect to the supplying of feeding air which is compressed at a high flow at a pressure generally between 4 and $17 \times 10^5$ Pa absolute. On the other hand, these units produce a residual mixture containing a high amount of nitrogen which is partially exploited in the apparatus, for example, for partially cooling the compressed feeding air, which should necessarily be cooled, typically at a temperature lower than 20° C., before purifying the compressed air and introducing same in the separation unit.

SUMMARY OF INVENTION

It is an object of the present invention to propose a process, which is simple and reliable, while enabling to reduce the consumption of energy of such apparatuses, and offers a high flexibility of use and is capable of many applications.

For this purpose, according to a characteristic of the invention, the process comprises the steps of compressing feeding air at a pressure higher than $4 \times 10^5$ Pa and at a temperature higher than 100° C., typically higher than 150° C., utilizing hot compressed feeding air as a source of heat for a refrigerating unit operating by absorption to produce a cold fluid, and effecting heat-exchange between the cold fluid and a gas of the apparatus to cool the latter.

According to more specific characteristics of the invention, the cooled gas consists of the feeding air, which is compressed or to be compressed, one of the components of the air produced by the separation unit, or another gas which is used in the apparatus.

With such a process, the excess calories of the compressed feeding air flow are used to operate a refrigerating group operating by absorption, to provide frigories which can be used in different manners by providing a high flexibility of operation and a high reliability as compared to refrigerating apparatuses of the type operating with rotary machines.

The present invention also concerns an apparatus for exploiting gases present in the air, comprising at least one unit for separating gases present in the air, which is supplied with compressed air by means of a compressor, the compressed feeding air inlet line passing through at least one cooling station, characterized in that it comprises at least one non-cooled compressor providing compressed feeding air at a temperature higher than 100° C., and at least one refrigerating unit operating by absorption in which the hot source is thermally associated with a compressed feeding air line in which the cold fluid circuit is thermally associated with the gas line of the apparatus for cooling said gas.

The apparatus may be of any type exploiting at least one of the gases (typically oxygen) produced by the separation unit, such as an apparatus, so-called "IGCC" for providing electrical energy by combustion of a gas which is synthesized by gasifying carbon or an apparatus for the direct reduction of an iron ore by the process called "COREX" which both utilize oxygen produced in situ. In both cases, the air compressor is a gas turbine compressor coupled to an electrical generator, the compressor providing air compressed at more than $8 \times 10^5$ Pa at a temperature higher than 250° C. The apparatus may also be a blast furnace which operates with over-oxygenated air, with oxygen produced in situ, in which case the air compressor is a blower providing compressed air at $4 \times 10^5$ Pa at a temperature of the order of 150° to 200° C.

BRIEF DESCRIPTION OF DRAWINGS

Other characteristics and advantages of the present invention will appear from the description which follows of embodiments, given by way of illustration but without limitation, with reference to the annexed drawings, in which.

DESCRIPTION OF PREFERRED EMBODIMENTS

Figure 1:
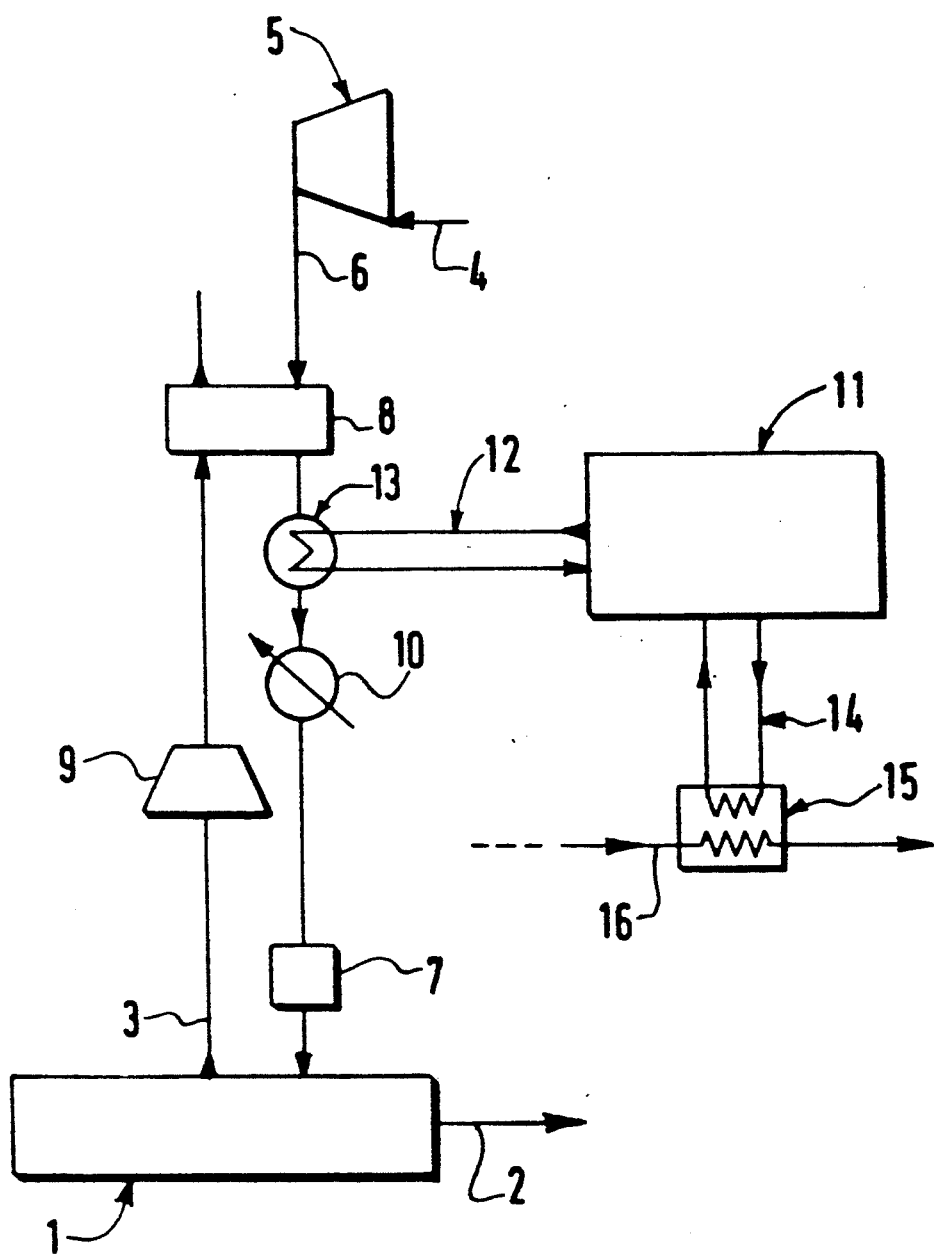
FIG. 1 is a schematic illustration of the process according to the invention.

In the description which follows and in the drawings, identical or analogous elements are represented by the same reference numerals.

FIG. 1 represents a unit for separating gases which are present in the air 1, typically a cryogenic unit for air distillation, providing at least gaseous oxygen in an outlet line 2 and residual gaseous nitrogen in an outlet line 3. The air which is fed to unit 1 is sent, as shown at 4, to a compression unit 5 which is not cooled, providing, in an outlet line 6, air which is compressed at a pressure higher than $5 \times 10^5$ Pa absolute at a temperature higher than 100° C., typically between 150° and 500° C. This compressed air should be cooled before passing it through a station for removing water and carbon dioxide 7, and introducing it into separation unit 1. A first cooling of compressed air is advantageously carried out, at the outlet of the compression unit 5, in an exchanger 8 through which residual nitrogen passes in counter-current, said residual nitrogen originating from line 3 and being typically compressed in a compressor 9. Since the flow of nitrogen is necessarily inferior to the air flow, the latter has an available heat content which is in excess. A second downstream cooling is typically carried out, upstream of the purifier station 7, in a second heat exchanger 10 which is cooled by water circulation, in known manner.

According to an aspect of the invention, a portion of the line for feeding compressed air 6 is operatively connected to a refrigerating unit operating by absorption 11 of the type operating with a binary mixture, for example, water/lithium bromide or ammonia/water and commercialized, for example, by Carrier and Borsig. The recovery, in the refrigerating unit 11, of the heat from the compressed air, may be directly carried out by passing hot air in the reboiler of the absorption group (in the case of a binary mixture water/ammonia), by means of a water vapour circuit, where a recovery vat recovers the heat from the air to produce the vapour used in the absorption group, or, as illustrated in FIG. 1, by means of a pressurized hot water circuit 12 in heat exchange relationship with feeding compressed air in an exchanger 13 disposed in line 6 between the exchangers 8 and 10, the hot water releasing its calories to the refrigerating unit operating by absorption 11. The latter includes a circuit 14 for circulating a cold fluid, typically water, that is allowed to pass through a heat exchanger 15 to cool a gas which circulates in a gas line 16 of the apparatus.

In a first embodiment of the invention, where the apparatus also includes a nitrogen or oxygen liquifier, the gas to be liquified is sent, through line 16, to be precooled in exchanger 15, to a temperature of about −40° C., before being more extensively cooled and liquified, typically in expansion turbines. In this case, the refrigerating unit 11 is necessarily of the type ammonia/water.

According to another embodiment of the invention, in order to decrease the power of the compression group 5, the gas which passes through exchanger 15 in line 16, consists of the air which is fed to the compression unit 5, the exchanger 15 being disposed at the suction inlet 4 of the latter. Similarly, the gas which passes through exchanger 15 in line 16, may be the residual nitrogen from line 3, which originates from an interstage of compressor 9 and which is returned, after having been cooled, into the interstage.

According to another embodiment, the gas which circulates in line 16 may be the ambient air which is used for the air conditioning of parts or units of the apparatus.

Figure 2:
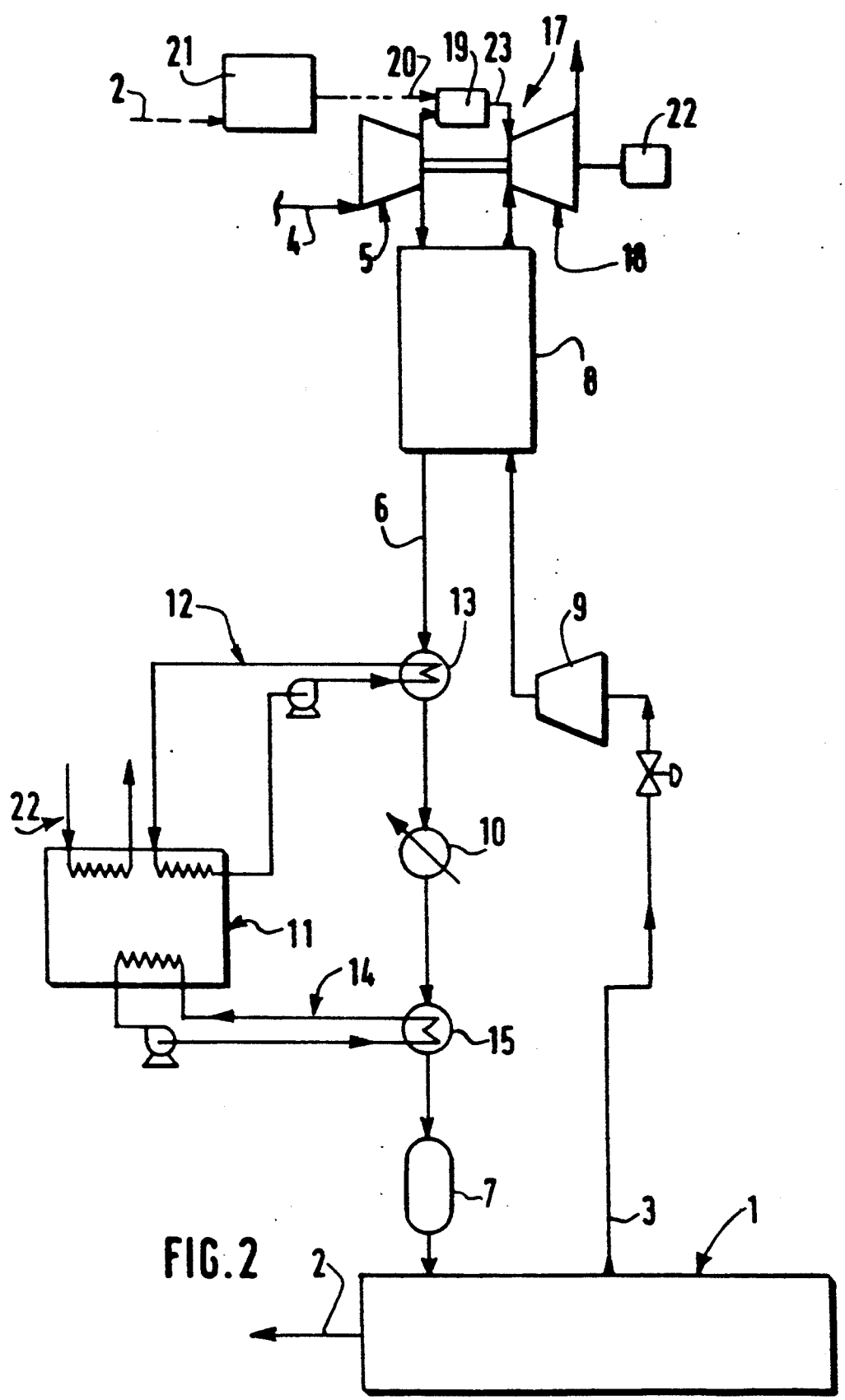
FIG. 2 is a schematic view of an apparatus according to the invention.

According to another embodiment of the invention, illustrated in FIG. 2, the gas which is cooled in exchanger 15 consists of the compressed feeding air itself. In FIG. 2, the elements already described with respect to FIG. 1 are shown. In this embodiment, group 5 for compressing feeding air is an element of a moto-compressor group 17 comprising a turbine 18 and a combustion chamber 19 which is supplied by a portion of the air which is compressed in group 5 and by a fuel 20. Fuel 20 may be fuel oil, natural gas or a synthesis gas which comes from a treatment unit 21, for example, a unit for gasifying coal or a unit for the reduction of iron ore, supplied with oxygen produced at the outlet 2 of the separation unit 1. Turbine 18, which operates compression group 5 and an electrical generator 22, is operated by the combustion gases 23 from combustion chamber 19 and advantageously by the residual nitrogen from line 3 which is compressed in compressor 9 and cooled in exchanger 8. In this embodiment, the line for feeding compressed air 6 comprises, between water cooling exchanger 10 and purifying unit 7, exchanger 15 associated with the cold liquid circuit 14 of the refrigerating group operating by absorption 11, in which the additional circuit of cooling water is shown at 22.

By way of illustration, in the embodiment of FIG. 2, the compressed feeding air, at the outlet of the compression group 5, is at a pressure of about $16 \times 10^5$ Pa absolute and a temperature of the order of 400° C. It is first cooled in exchanger 8 at a temperature of about 210° C. and it transfers its heat, in exchanger 13, to water in circuit 12 containing hot water which is pressurized at a pressure of about $15 \times 10^5$ Pa absolute. The compressed air exits from the exchanger 13 at a temperature of about 180° C. and is cooled at a temperature of about 30° C. in exchanger 10. The compressed air is finally cooled at a temperature of about 10° C. in exchanger 15 with cold water at a temperature of about 7° C. which comes from the refrigerating group operating by absorption 11, which here has a refrigerating power higher than 2 Mw. The cooled compressed air is purified by removing carbon dioxide and water in the purifying station 7 after which it is introduced into separation unit 1. The latter supplies, in line 3, residual nitrogen which is compressed at a pressure of about $19 \times 10^5$ Pa absolute in compressor 9, and is heated at a temperature of about 360° C. in exchanger 8 before being introduced into turbine 18. Hot water in circuit 12, pressurized at a pressure of about $15 \times 10^5$ Pa absolute, is heated at a temperature of about 145° C. in exchanger 13 to release its calories in the refrigerating group 11 where it exits again at a temperature of about 120° C. Cold water in circuit 14, which exits at a temperature of 7° C. from the refrigerating unit 11, is heated in exchanger 15 up to a temperature of about 12° C. In this example, with a refrigerating group 11 of the type water/lithium bromide, the global energy gain of the apparatus is about 800 KW electrical. In this type of apparatus according to the invention, the global energy gain is of the order 3 to 5% depending on the size of the apparatus.

Although the present invention has been described with reference to specific embodiments, it is not limited thereto but, on the contrary, it is capable of modifications and variants, which will appear to one skilled in the art.

We claim:

1. A method of operating a plant exploiting at least one gas separated from a gas mixture by at least one gas mixture separation unit fed with a compressed gas mixture comprising:

transforming a hot flux into a cold flux by absorption-type refrigeration;

compressing the gas mixture fed to the gas mixture separation unit to produce a compressed and heated gas mixture;

utilizing the compressed gas mixture fed to the gas mixture separation unit as a heat source providing the hot flux for said absorption-type refrigeration; and utilizing the cold flux of said absorption-type refrigeration to cool a gas stream in the plant.

2. The method of claim 1, wherein the cooled gas stream is the gas mixture fed to the gas mixture separation unit.

3. The method of claim 2, further comprising the step of cooling the compressed gas mixture by heat exchange with a nitrogen-rich mixture furnished by the gas mixture separation unit before the compressed gas mixture is used as the hot flux for said absorption-type refrigeration.

4. The method of claim 1, wherein the cooled gas stream is a gas separated from the gas mixture by the gas mixture separation unit.

5. The method of claim 1 wherein the gas mixture is air.

6. The method of claim 5, wherein the cooled gas stream is a gas separated from the air by the gas mixture separation unit.

7. The method of claim 5, wherein the cooled gas stream is the air fed to the gas mixture separation unit.

8. The method of claim 7, further comprising the step of cooling the compressed air by heat exchange with a nitrogen-rich mixture furnished by the gas mixture separation unit before the compressed air is used as the hot flux for said absorption-type refrigeration.

9. The method of claim 5, wherein the air is compressed to a pressure not less than $4 \times 10^5$ Pa.

10. The method of claim 5 wherein the compressed air is at a temperature not less than 100° C.

11. A plant for exploiting at least one gas separated from a gas mixture, comprising:
- at least one gas mixture separation unit for converting a pressurized gas mixture into said at least one gas;
- at least one non-cooled compressor for feeding the gas mixture separation unit via a compressed gas mixture feed line and supplying a pressurized and heated gas mixture;
- an absorption-type refrigerating unit having a heat flux receiving side and a cold flux delivering side, the heat flux side of the refrigerating unit being thermally coupled to a portion of the compressed gas mixture feed line;
- and at least a gas line thermally coupled to the cold flux side of the refrigerating unit for cooling a gas circulating in said gas line.

12. The plant of claim 11, wherein said gas to be cooled is said at least one gas separated from the gas mixture by the gas mixture separation unit.

13. The plant of claim 11, wherein the refrigerating unit is of the binary fluid mixture type.

14. The plant of claim 13, wherein the refrigerating unit is of the binary fluid lithium bromide/water type.

15. The plant of claim 11, wherein said gas to be cooled is the gas mixture feeding the gas mixture separation unit.

16. The plant of claim 11, wherein said compressed gas mixture feed line has an upstream portion and a downstream portion and wherein said gas line thermally coupled to the cold flux side of the refrigerating unit is the downstream portion of the compressed gas mixture feed line.

17. The plant of claim 11, wherein said gas mixture is air.

18. The plant of claim 17, wherein said gas to be cooled is the air feeding the gas mixture separation unit.

19. The plant of claim 18, further comprising:
- a mixture line for a nitrogen-rich mixture produced by the gas mixture separation unit;
- at least one heat exchanger for heat exchange between said mixture line and an upstream portion of the compressed gas mixture feed line, said compressed gas mixture feed line having an intermediate portion, thermally coupled to the heat flux side of the refrigerating unit and a downstream portion thermally coupled to the cold flux side of the refrigerating unit.

20. The plant of claim 19, wherein said at least one non-cooled compressor is the compressor of a gas turbine group having a combustion chamber and a turbine driven by the combustion chamber to drive the compressor.

21. The plant of claim 20, further comprising a combustible generating unit having an oxygen inlet and supplying fuel to the combustion chamber, the gas mixture separation unit having an oxygen outlet connected to the oxygen inlet of the combustible generating unit.

22. The plant of claim 21, wherein the mixture line discharges into an inlet side of the turbine.

23. The plant of claim 17, wherein the pressurized air is at a pressure not less than $4 \times 10^5$ Pa.

24. The plant of claim 17 wherein the pressurized air is at a temperature not less than 100° C.

* * * * *